United States Patent
Singh

(10) Patent No.: US 10,950,361 B2
(45) Date of Patent: *Mar. 16, 2021

(54) HIGH-DENSITY SUBTERRANEAN STORAGE SYSTEM FOR NUCLEAR FUEL AND RADIOACTIVE WASTE

(71) Applicant: Holtec International, Camden, NJ (US)

(72) Inventor: Krishna P. Singh, Hobe Sound, FL (US)

(73) Assignee: HOLTEC INTERNATIONAL, Camden, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/453,282

(22) Filed: Jun. 26, 2019

(65) Prior Publication Data

US 2020/0027617 A1 Jan. 23, 2020

Related U.S. Application Data

(63) Continuation of application No. 15/838,414, filed on Dec. 12, 2017, now Pat. No. 10,446,287, which is a continuation of application No. 14/760,215, filed as application No. PCT/US2014/010967 on Jan. 10, 2014, now Pat. No. 9,852,822.

(Continued)

(51) Int. Cl.
*B09B 1/00* (2006.01)
*G21F 9/36* (2006.01)
(Continued)

(52) U.S. Cl.
CPC ............... *G21F 9/36* (2013.01); *B09B 1/008* (2013.01); *B65D 21/0224* (2013.01);
(Continued)

(58) Field of Classification Search
CPC ..................................... G21F 9/34; G21F 9/36
See application file for complete search history.

(56) References Cited

U.S. PATENT DOCUMENTS 2,429,958 A 10/1947 Liebmann
4,535,250 A 8/1985 Fields
(Continued)

FOREIGN PATENT DOCUMENTS

GB 1409046 10/1975

OTHER PUBLICATIONS

Corresponding International Search Report for PCT/US14/10967, dated May 21, 2014, pp. 1-13.

*Primary Examiner* — Janine M Kreck
(74) *Attorney, Agent, or Firm* — The Belles Group, P.C.

(57) ABSTRACT

An underground ventilated system for storing nuclear waste materials. The system includes a storage module having an outer shell defining an internal cavity and an inner shell. A majority of the height of the outer shell may be disposed below grade. The outer shell may include a hermetically sealed bottom. First and second canisters are positioned in lower and upper portions within the cavity respectively in vertically stacked relationship. A centering and spacing ring assembly is interspersed between the first and second canisters to transfer the weight of the upper second canister to the lower first canister. The assembly may include centering lugs which laterally restrain the first and second canisters in case of a seismic event. A natural convection driven ventilated air system cools the canisters to remove residual decay heat to the atmosphere. In one non-limiting embodiment, the shells are made of steel.

21 Claims, 10 Drawing Sheets

Related U.S. Application Data

(60) Provisional application No. 61/750,986, filed on Jan. 10, 2013.

(51) Int. Cl.
| | | |
|---|---|---|
| *B65D 21/02* | (2006.01) | |
| *B09B 3/00* | (2006.01) | |
| *B65D 43/02* | (2006.01) | |
| *G21F 5/14* | (2006.01) | |
| *G21F 7/015* | (2006.01) | |
| *G21F 7/06* | (2006.01) | |

(52) U.S. Cl.
CPC ............. *B09B 1/006* (2013.01); *B09B 3/0025* (2013.01); *B65D 43/02* (2013.01); *G21F 5/14* (2013.01); *G21F 7/015* (2013.01); *G21F 7/06* (2013.01)

(56) References Cited

U.S. PATENT DOCUMENTS

| | | | |
|---|---|---|---|
| 4,572,372 A * | 2/1986 | Smith | B65D 21/0215 |
| | | | 206/504 |
| 4,834,256 A | 5/1989 | McMillin | |
| 4,861,194 A * | 8/1989 | Lang | B09B 1/00 |
| | | | 405/129.55 |
| 9,852,822 B2 * | 12/2017 | Singh | G21F 5/14 |
| 2009/0159550 A1 | 6/2009 | Singh et al. | |
| 2010/0090049 A1 | 4/2010 | Weissbrod | |
| 2011/0172484 A1 | 7/2011 | Singh et al. | |
| 2011/0255647 A1 * | 10/2011 | Singh | G21F 5/005 |
| | | | 376/272 |
| 2011/0286567 A1 * | 11/2011 | Singh | G21C 19/08 |
| | | | 376/272 |
| 2012/0083644 A1 | 4/2012 | Singh | |

\* cited by examiner

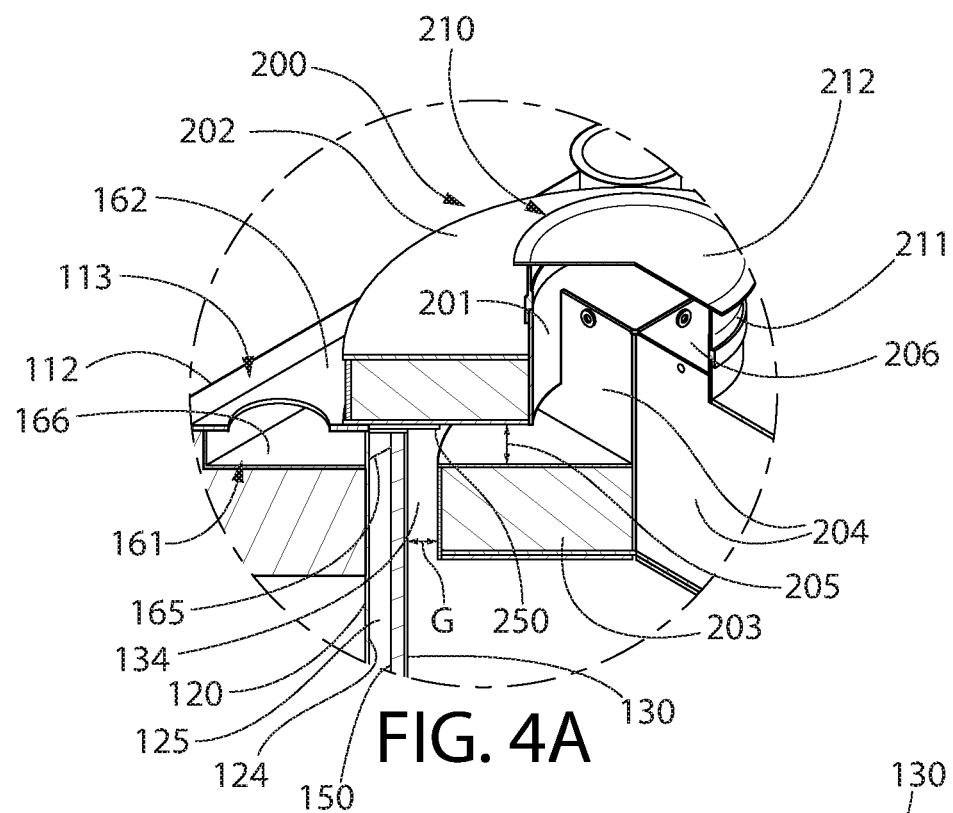
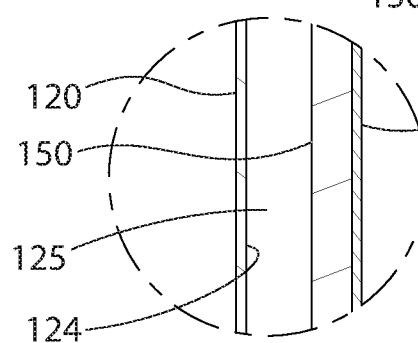
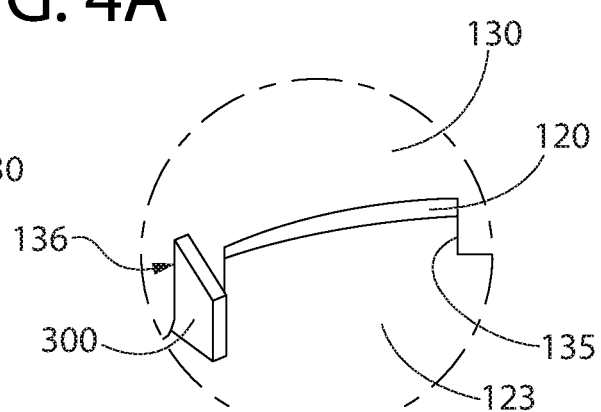
FIG. 4A
FIG. 4B
FIG. 4C

US 10,950,361 B2

HIGH-DENSITY SUBTERRANEAN STORAGE SYSTEM FOR NUCLEAR FUEL AND RADIOACTIVE WASTE

CROSS-REFERENCE TO RELATED APPLICATIONS

The present application is a continuation of U.S. patent application Ser. No. 15/838,414 filed Dec. 12, 2017, which is a continuation of U.S. patent application Ser. No. 14/760, 215 filed Jul. 10, 2015 (now U.S. Pat. No. 9,852,822), which is a U.S. national stage application under 35 U.S.C. § 371 of PCT/US2014/010967 filed Jan. 10, 2014, which claims the benefit of U.S. Provisional Patent Application Ser. No. 61/750,986 filed Jan. 10, 2013; the entireties of which are incorporated herein by reference.

FIELD OF THE INVENTION

The present invention relates to spent nuclear fuel and radioactive waste storage systems, and more particularly to such a system suitable for consolidated interim waste storage.

BACKGROUND OF THE INVENTION

Used or spent nuclear fuel and radioactive waste materials are presently stored on an interim basis "on site" at commissioned and some decommissioned nuclear generating plants until the federal government provides a central permanent repository. For example, spent nuclear fuel is stored in the reactor fuel pool after removal from the core where it continues to generate decay heat. The fuel can be transferred after a period of cooling in the pool to canisters which are placed in dry storage casks (i.e. overpacks) typically constructed of concrete, steel, and iron, etc. to provide containment and radiation shielding. The casks are stored on site at the generating plant.

The concept of using consolidated interim storage (CIS) is intended to provide geographically distributed off-site storage facilities for spent nuclear fuel and radioactive wastes (collectively "waste") gathered from a number of individual generating plant sites, thereby providing greater control over the widely dispersed waste stockpiles. The waste materials would initially be transported to the CIS facility from the generating plants for a period of time, with the eventual goal of a final move to a permanent nuclear waste repository when available. Such so called independent spent fuel storage installations (ISFSI) are facilities designed for the interim storage of spent nuclear fuel comprising solid, reactor-related, greater than Class C waste, in addition to other related radioactive materials. Each ISFSI facility would typically maintain an inventor of a multitude of waste canisters containing spent nuclear fuel and/or radioactive waste materials.

SUMMARY OF THE INVENTION

The present disclosure provides a below-ground used or spent nuclear fuel storage system designed for the compact dry storage of a large number of used fuel canisters in a small land area. In a non-limiting exemplary embodiment, two or more elongated canisters may be stored in vertically oriented and stacked relationship in each of a plurality of underground vertical ventilated storage modules which provide an overpack. The storage modules may be diametrically sized to fit a single canister therein at a given elevation, as further described herein. The collective array of storage modules defines an independent spent fuel storage installation (ISFSI) facility suitable for CIS that may include any number and arrangement of modules.

The canisters may contain both radioactive used nuclear fuel and/or non-fuel waste materials in some embodiments. In one embodiment, the canisters may be Multi-Purpose Canisters (MPCs) available from Holtec International of Marlton, N.J.

The underground storage system is intended to provide vanishingly low site boundary radiation dose levels and safety during catastrophic events. As an underground system, the system takes advantage of the surrounding soil or subgrade to provide shielding, physical protection, and a low center of gravity for a stable storage installation. Each vertical storage module provides storage of canisters in a vertical configuration inside a cylindrical cavity located entirely below the top-of-grade in the storage facility. The vertical modules may each be generally comprised of a cavity enclosure container formed by an outer shell, an inner divider shell, and a top closure lid in addition to various interfacing structures and features, as further described herein.

The canister storage system is further configured to provide passive heat removal from the canisters via natural convection during storage in the modules, thereby rejecting the used fuel's decay heat emitted to the ambient air above the module. Radiation emitted from the used nuclear fuel is substantially contained within the soil fill in which the modules are disposed and canisters stored.

Advantageously, stacking two canisters in each vertical ventilated storage module according to the present disclosure ultimately cuts the required storage area in half. For example, a 14 acre ISFSI for CIS can store 4,000 canisters containing more than 50,000 tons of uranium. This significantly reduces siting requirements. The radiation released to the environment from such a CIS facility storing used fuel may be negligible.

According to one exemplary embodiment, a system for vertically-stacked storage of nuclear waste canisters includes an elongated outer shell defining a vertical axis and an internal cavity; a first canister positioned in the cavity in a lower position; a second canister vertically stacked above the first canister in an upper position, the first and second canisters being concentrically aligned with the vertical axis; a centering and spacing ring assembly interspersed between the first and second canisters; and a removable top lid mounted on top of the outer shell covering the cavity. The centering and spacing ring assembly is arranged and operable to transfer weight of the second canister to the first canister.

According to another embodiment, a storage module for vertically-stacked storage of nuclear waste canisters includes an elongated outer shell defining a vertical axis and an internal cavity; an elongated inner shell disposed in the internal cavity; a first annular space formed between the inner and outer shells, the first annular spacing defining a vertical downcomer ventilation shaft operable to convey ambient cooling air downwards to the cavity; a first canister positioned in the cavity in a lower position; a second canister vertically stacked above the first canister in an upper position, the first and second canisters being concentrically aligned with the vertical axis; a middle centering and spacing ring assembly interspersed between the first and second canisters, the middle centering and spacing ring assembly operable to transfer weight of the second canister to the first canister; a second annular space formed between the first and second canisters and the inner shell, the second annular space defining a vertical riser ventilation shaft operable to convey cooling air upwards across outer surfaces of the canisters; and a removable top lid mounted on top of the outer shell covering the cavity, the top lid being in fluid communication with the riser ventilation shaft and configured to form an airflow pathway to atmosphere through the lid.

According to another embodiment, an underground storage module for vertically-stacked storage of nuclear waste canisters includes an elongated vertical outer shell defining vertical axis and an internal cavity, the outer shell having a top and a hermetically sealed bottom, the outer shell being disposed below grade for a majority of its height; a common inlet air plenum disposed at the top of the outer shell, the air plenum arranged to draw ambient cooling air through a plurality of air inlets in fluid communication with the air plenum; an annular-shaped vertical downcomer ventilation shaft arranged to convey the cooling air from the inlet air plenum downwards along the outer shell to a bottom of the cavity; a first canister positioned in the cavity in a lower position; a second canister vertically stacked above the first canister in an upper position, the first and second canisters being concentrically aligned with the vertical axis; an elongated inner shell disposed inside the outer shell and cavity; an annular-shaped vertical riser ventilation shaft formed between the inner shell and the canisters, the riser ventilation shaft being in fluid communication with the downcomer ventilation shaft near the bottom of the outer shell and arranged to convey cooling air upwards across outer sidewall surfaces of the canisters for removing decay heat; and a removable top lid mounted on top of the outer shell covering the cavity, the top lid in fluid communication with the riser ventilation shaft and configured to form an airflow pathway to atmosphere through the lid from the riser ventilation shaft.

BRIEF DESCRIPTION OF THE DRAWINGS

The features of the exemplary embodiments of the present invention will be described with reference to the following drawings, where like elements are labeled similarly, and in which:

FIG. 4A is a detailed view from FIG. 4;

FIG. 4B is a detailed view from FIG. 4;

FIG. 4C is a detailed view from FIG. 4;

All drawings are schematic and not necessarily to scale. Parts given a reference numerical designation in one figure may be considered to be the same parts where they appear in other figures without a numerical designation for brevity unless specifically labeled with a different part number and described herein. References herein to a figure number (e.g. FIG. 1) shall be construed to be a reference to all subpart figures in the group (e.g. FIGS. 1A, 1B, etc.) unless otherwise indicated.

DETAILED DESCRIPTION OF THE EMBODIMENTS

Figure 1:
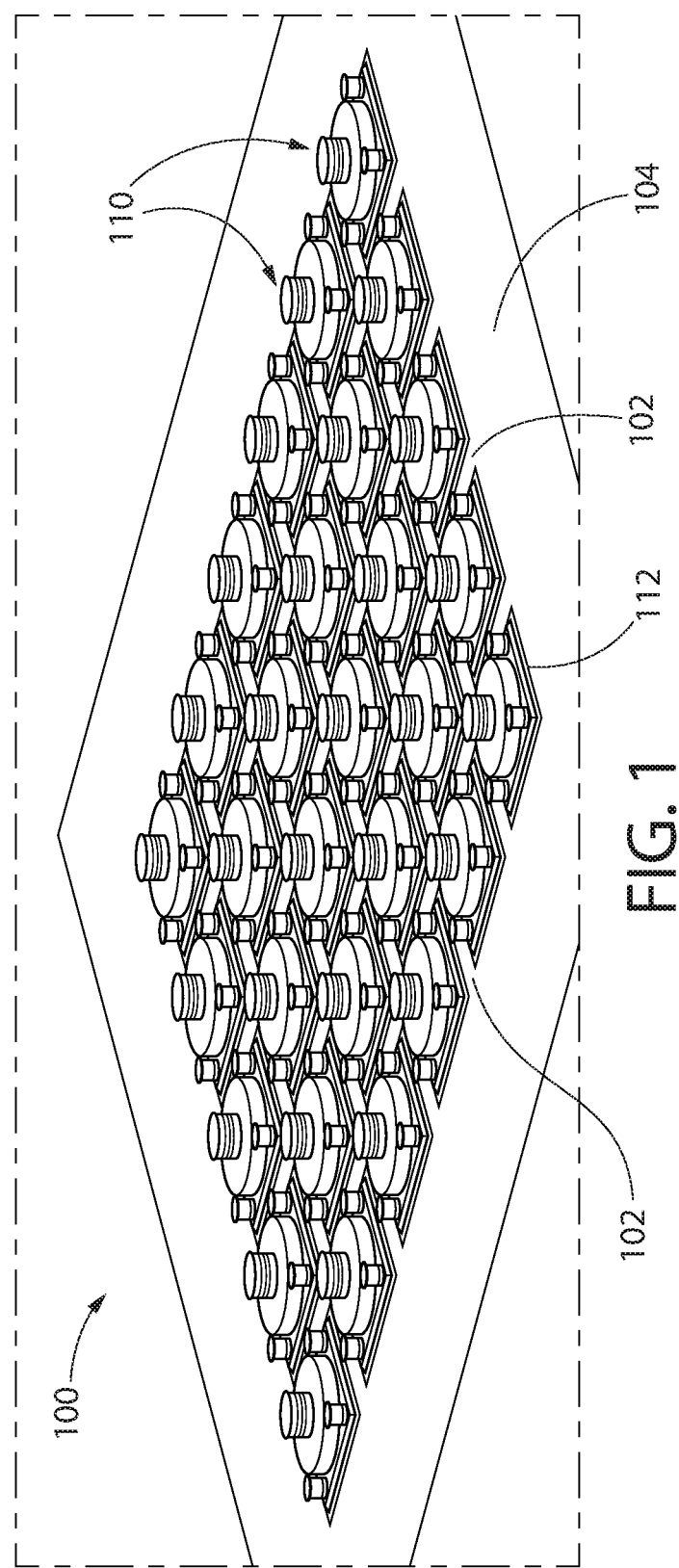
FIG. 1 is a perspective view of an ISFSI facility for consolidated interim storage of spent nuclear fuel and waste materials utilizing an array of underground storage modules each capable of holding at least two canisters according to an embodiment of the present invention.

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

FIG. 1 depicts an ISFSI facility forming a high-density subterranean Consolidated Interim Storage (CIS) system 100 comprising an array of underground vertical ventilated storage modules 110. In one embodiment, each storage module 110 houses at least two sealed canisters containing spent nuclear fuel and/or radioactive waste materials. The storage modules 110 are arranged in a tightly packed configuration to minimize spatial site requirements. The storage modules 110 are spaced apart by a grid of orthogonally intersecting aisles 102 formed of concrete slabs 104 to provide access for commercially-available motorized wheeled equipment operable to move and lift (i.e. raise/lower) the canisters for insertion into and removal from the modules. Such equipment is well known to those skilled in the art without further elaboration. The low exposed vertical profile of the storage modules 110 (as further described herein) allows the equipment to move over modules in a single row to the desired module for inserting or removing canisters.

Each storage module 110 may include an associated concrete top pad 112 which is positioned and disposed between the aisles 102 of slabs 104. The top pads 112 may form a contiguous structure with slabs 104 to provide radiation shielding. The top pads 112 may be square-shaped in top plan view in one non-limiting example; however, other suitable polygonal and non-polygonal configurations (e.g. circular) may be used.

Figure 2:
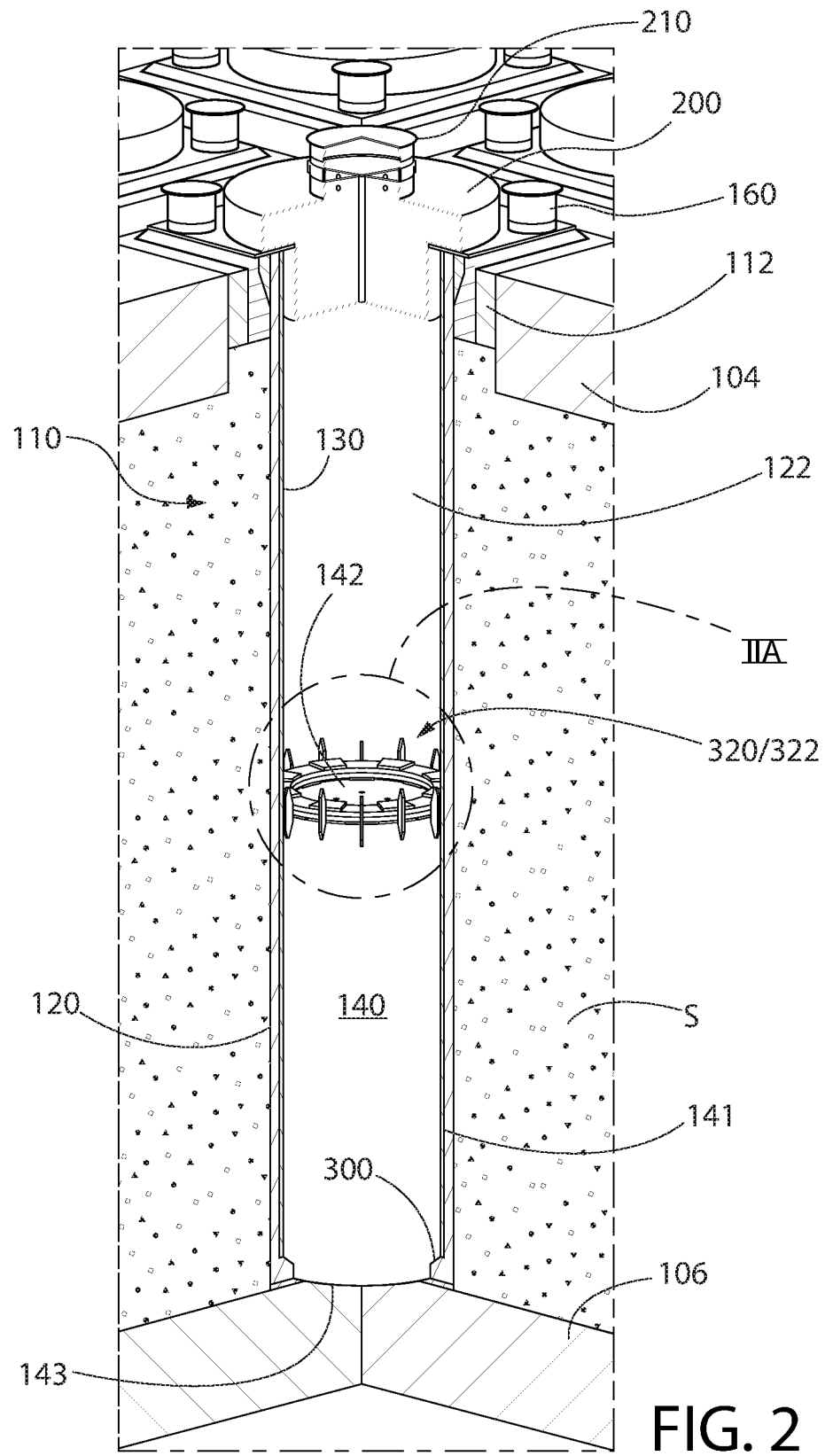
FIG. 2 is a three-dimensional cross-sectional view of a fully installed storage module of FIG. 1 showing one nuclear waste canister in a lower position in the module.

FIG. 2 is a cross-sectional view of a single storage module 110 from FIG. 1. With additional reference to FIGS. 6 and 6A, storage module 110 is vertically elongated and includes a vertically-extending outer shell 120 defining an internal cavity 122 and an inner shell 130. In one embodiment, outer and inner shells 120, 130 are cylindrically and complementary shaped, albeit dimensionally different. The outer shell 120 provides an impermeable barrier against leakage of ground water through the earthen soil S fill into the storage module 110. Outer shell has an open top 121 and a closed bottom formed by bottom plate 123 at the bottom end of the shell. Bottom plate 123 may be substantially flat and is preferably seal welded to outer shell 120 in one embodiment to hermetically seal the bottom of the shell thereby forming an impermeable barrier to ingress of external ground water. Accordingly, all portions of storage module 110 below grade are sealed against the ingress of moisture or water from the environment transmitted through the soil.

Figure 6:
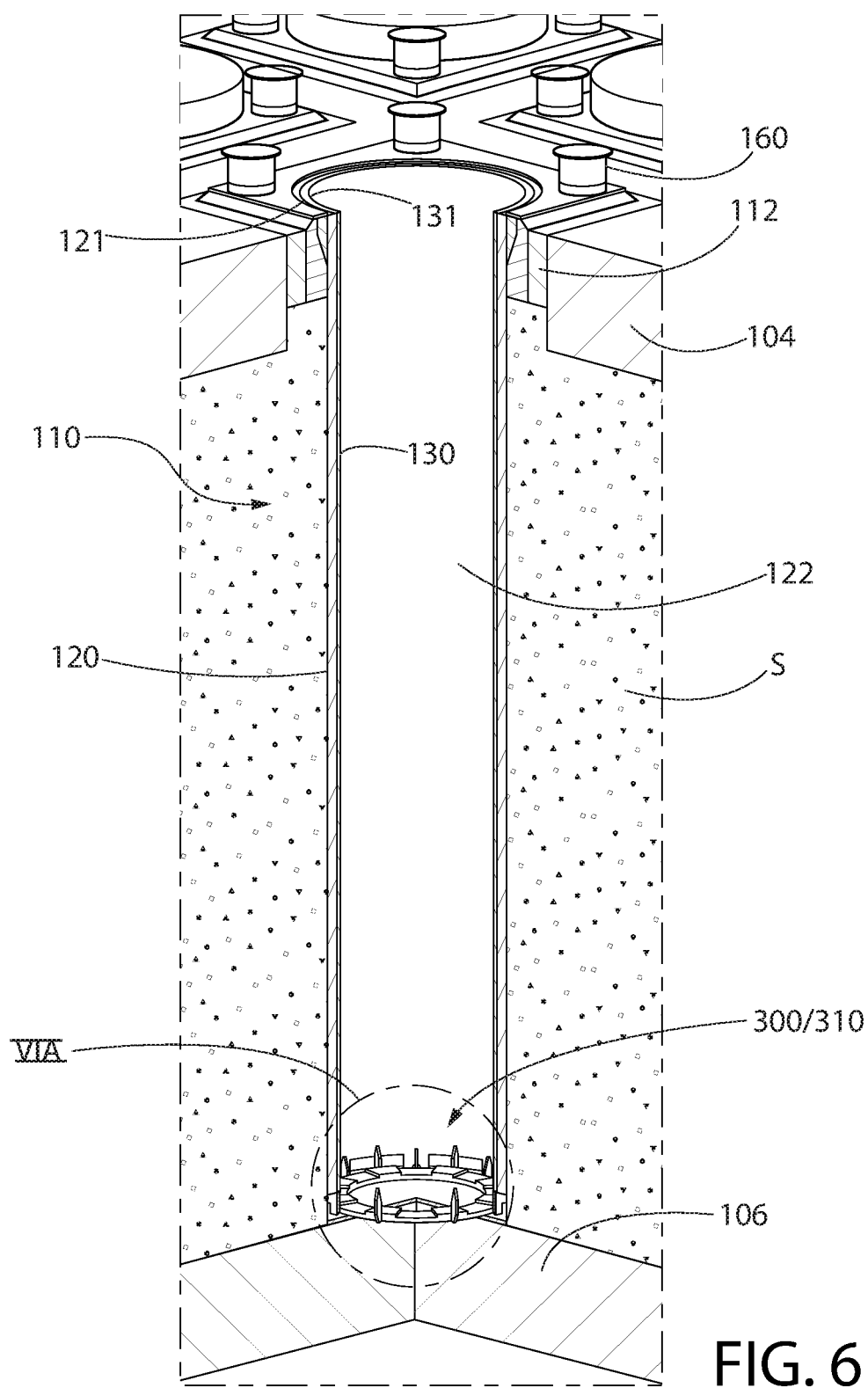
FIG. 6 is a three-dimensional cross-sectional view of a fully installed empty storage module before placement of the canisters and removable top lid.

The bottom plate 123 of outer shell 120 may be positioned on and supported by a concrete base pad 106. The area adjacent the outer shell 120 between the top pad 112 and base pad 106 is filled with fill or soil "S", thereby forming a cross-sectional composite structure of upper and lower concrete caps with soil disposed therebetween. A majority of the height of the outer and inner shells 120, 130 is disposed below grade as shown in FIGS. 2 and 6. The top portion of outer shell 120 is surrounded by the top pad 112 and embedded therein so that virtually none or only a small projection of the top end 121 of the outer shell protrudes above the concrete pad. Substantially the entire height of the outer shell 120 is therefore embedded in soil and/or concrete in the embodiment being described.

It will be appreciated that in some embodiments, a monolithic concrete base pad 106 may extend beneath a plurality or cluster of individual storage modules 110 in lieu of individually poured pads. Similarly, a monolithic top pad 112 may be used to surround and extend between a plurality or cluster of individual storage modules 110 in lieu of individually poured pads.

It will be appreciated that although the cross-sectional shape of the outer and inner shells 120, 130 may be cylindrical in the illustrated embodiment, the shells can have other suitable polygonal and non-polygonal shapes, including without limitation rectangular, conical, hexagonal, or irregularly shaped. In some embodiments, the outer and inner shells 120, 130 need not be concentrically aligned with each other.

Outer and inner shells 120, 130 and bottom plate 123 are made of metal, such as steel in exemplary non-limiting embodiments. Outer shell 120, which provides a barrier between the soil S in which the outer shell is embedded, is preferably made of a corrosion resistant metal such as without limitation coated steel, stainless steel, etc.

Figure 6A:
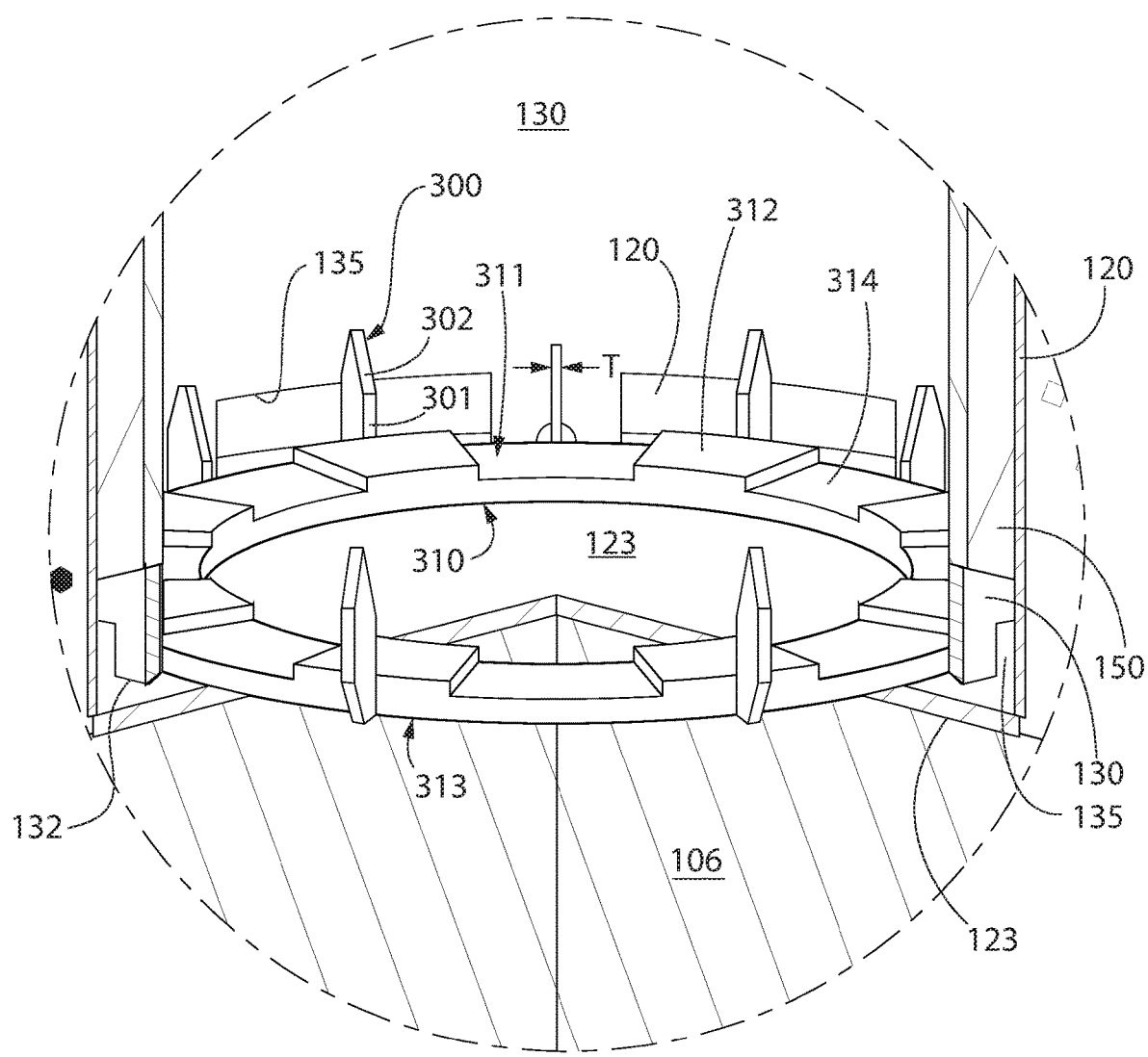
FIG. 6A is a detailed view from FIG. 6.

In one embodiment, inner shell 130 has an open top 131 and open bottom 132 (reference FIGS. 6 and 6A). The open top 131 allow insertion of canisters 140 into the storage module 110, as further described herein. Inner shell 130 may be coaxially and concentrically aligned with outer shell 120 about a vertical axis VA defined by storage module 110. Outer and inner shell 120, 130 have vertical heights that are substantially coextensive. The bottom 132 of inner shell 130 may rest on top of the bottom plate 123 of the outer shell 120 in one arrangement. The outer and inner shells 120, 130 have a sufficient height or depth suitable to allow at least two canisters 140 to be stored in a vertically stacked configuration or relationship. In other embodiments, the outer and inner shells 120, 130 may have heights or depths suitable for holding three or more vertically stacked canisters 140.

Inner shell 130 has a smaller diameter than outer shell 120. Inner shell 130 is radially spaced apart inwards from the outer shell 120 and acts to divide the cavity 120 into an outer annular space 124 and an inner portion configured and dimensioned to hold canisters 140. The outer annular space 124 extends from the top 121 to bottom plate 123 of outer shell 120.

The outer annular space 124 defines an annular-shaped vertical downcomer ventilation shaft 125 for introducing outside ambient cooling air into cavity 122 of storage module 110 to remove decay heat emitted from the spent nuclear fuel or radioactive waste material contained in canisters 140. To complete a natural convection heat removal airflow circuit, a second inner annular space 133 is defined between the outer cylindrical shell sidewall 141 of canister 140 and inner shell 130 which is radially spaced apart outwards from the canister. The second inner annular space 133 extends from the bottom 132 to top 131 of inner shell 130 and defines an annular-shaped vertical riser ventilation shaft 134 for removing heated cooling air from storage module 110. The inner shell 130 serves to separate the downcomer ventilation air from the up-flowing air heated by contact with the canister (see, e.g. airflow diagram of FIG. 5).

The downcomer ventilation shaft 125 is fluidly (i.e. airflow) separated and isolated from riser ventilation shaft 134 by inner shell 130 for substantially the entire vertical height of storage module 110 along shells 120, 130 except near the bottom of the storage module. The downcomer and riser ventilation shafts 125, 134 respectively are in fluid communication through a plurality of circumferentially arranged and spaced apart airflow openings 135 formed at the bottom end of the inner shell 130 near the bottom 132. The bottom end of shell 130 may have a castellated configuration in one embodiment with the openings 135 having a generally square or rectangular shaped configuration. Other suitable shaped airflow openings may be used however.

Figure 4:
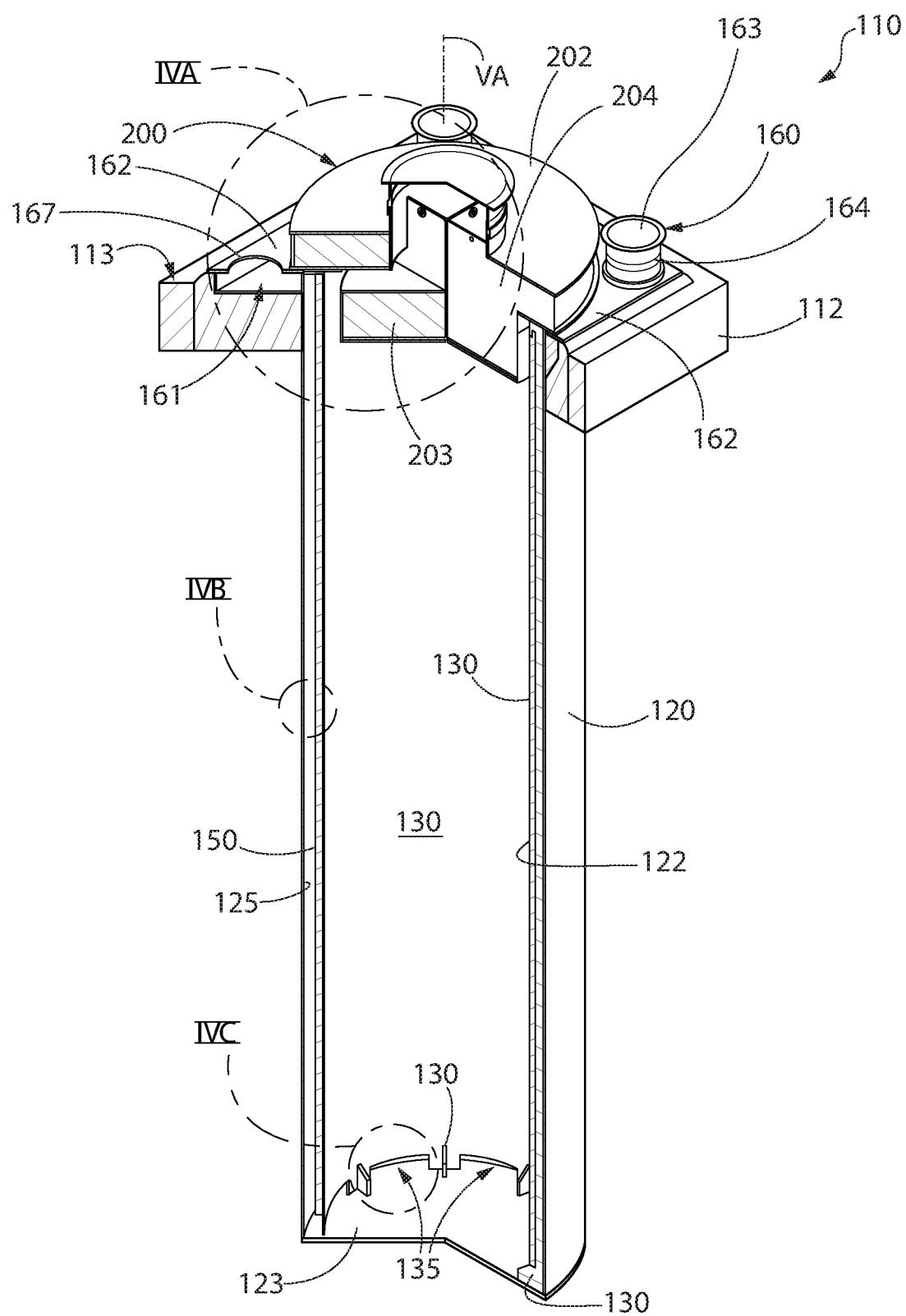
FIG. 4 is a three-dimensional cross-sectional view of a storage module with concrete top pad alone without soil or bottom concrete base pad.
Figure 5:
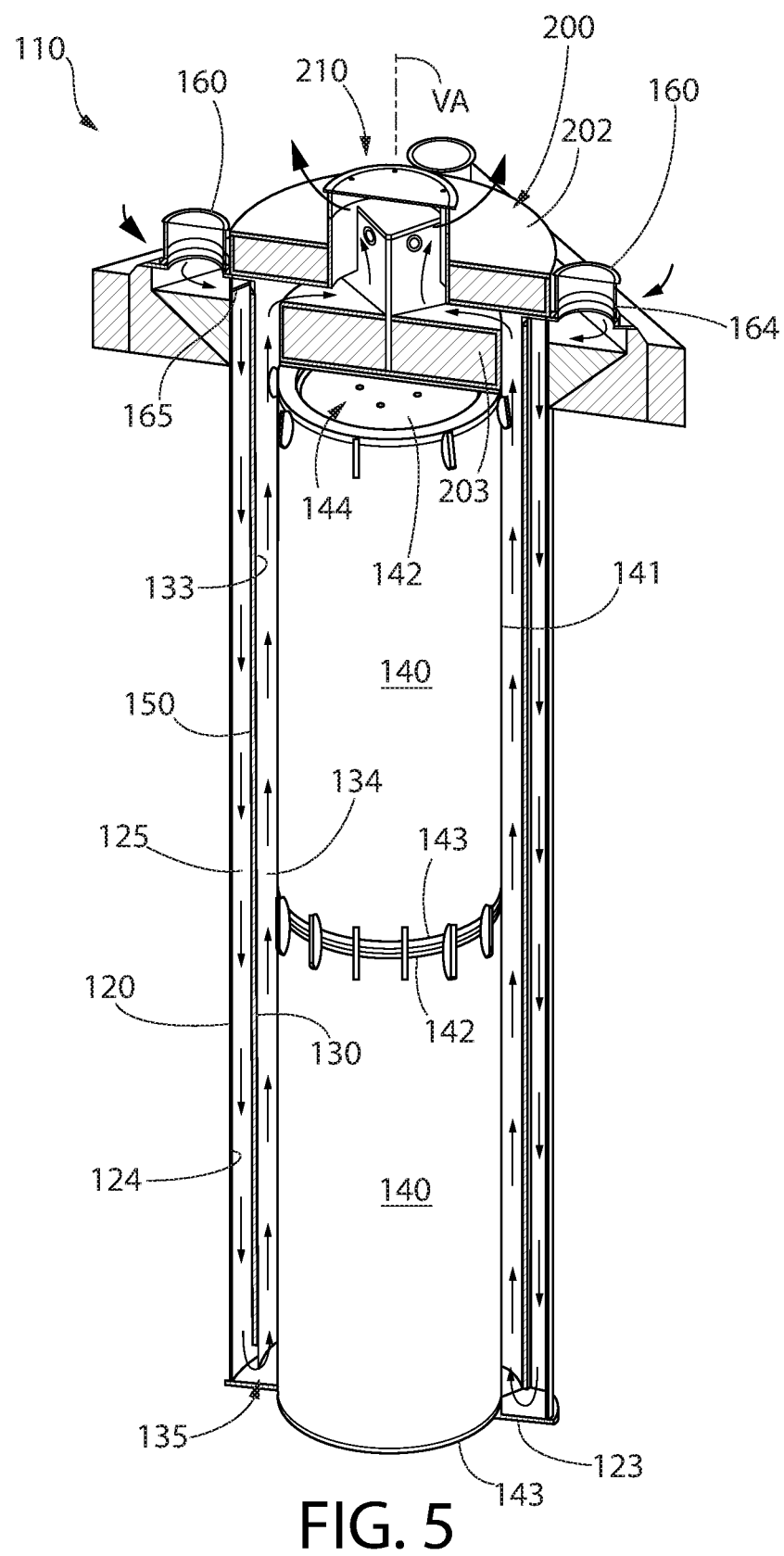
FIG. 5 is an airflow diagram showing the storage module and natural convection ventilation system showing the cooling air flow paths through the module.

In one embodiment, the inner "divider" shell 130 is insulated being provided with an insulation layer 150 to minimize heat exchange between the incoming cooling (downcomer ventilation shaft 125) and outgoing heated (riser ventilation shaft 134) ventilation air in contact with the inner shells inner and outer surfaces, respectively (see, e.g. FIGS. 4 and 5, and best shown in detail in FIG. 4B). This keeps the ambient cooling air drawn into the storage module 110 by natural convention as cold as possible until it encounters the hotter outer shell sidewall 141 of the canisters 140 to maximize cooling efficiency. In one embodiment, the insulation layer 150 is disposed on the outer surface of inner shell 130 between the inner shell and outer shell 120 in the downcomer ventilation shaft 125 to prevent damage which could potentially occur from inserting and removing canisters from the storage module 110. Any suitable type of insulating material may be used including without limitation separately formed and applied pliable, semi-rigid, and rigid insulating materials and sprayed on types (e.g. hardening foams). The insulation 26 is preferably chosen so that it is water and radiation resistant without substantial degradation. Some examples of suitable forms of insulation include, without limitation, blankets of alumina-silica fire clay (Kaowool Blanket), oxides of alumina and silica (Kaowool S Blanket), alumina-silica-zirconia fiber (Cerablanket), and alumina-silica-chromia (Cerachrome Blanket). The desired thickness of the of insulation layer 150 will be dictated by such considerations such as the heat load (e.g. temperature differential between ambient air and canister external temperatures), the thickness of the shells, and the type of insulation used (e.g. K factor). In some embodiments, the insulation may have a representative non-limiting thickness in a range of about ½ to 6 inches for example.

Canisters 140 stored in storage module 110 may be any type of canister, including without limitation Multi-Purpose Canisters (MPCs) available from Holtec International of Marlton, N.J. As shown in FIG. 5, canisters 140 have a generally hollow cylindrical shell sidewall 141 including a top 142 with removable and sealable lids 144 for inserting spent nuclear fuel and/or radioactive waste materials and an opposing bottom 143. The interior of canisters 140 may include racks or grids to contain and support spent fuel rods and waste materials.

FIGS. 4 and 4A show the construction of the upper portion of storage module 110 and top pad 112 in greater detail. The tops 121 and 131 of outer and inner shells 120, 130 respectively penetrate top pad 112, thereby providing external above grade access to downcomer ventilation shaft 125, riser ventilation shaft 134, and cavity 122 of storage module 110 for inserting and removing canisters 140. The top pad 112, which may be formed of concrete in a one preferred embodiment, extends at least partially beyond the diameter of outer shell 120 as shown. In this non-limiting example, the top pad 112 may have a square shape (in top plan view) as previously described. The perimeter of the top pad 112 would be adjoined by the access aisles 102 formed between adjacent storage modules 110.

With continuing reference to FIGS. 4 and 4A, top pad 112 includes one or more air inlets 160 which are in fluid communication with annular-shaped downcomer ventilation shaft 125 to introduce cooling ambient ventilation air into the storage module 110. A common recessed air plenum 161 covered by a removable cover plate 162 may be formed in top pad 112 around outer shell 120 to fluidly connect the air inlets to the ventilation shaft 125. Air plenum 161 further fluidly interconnects the air inlets 160 to each other. The air plenum 161 is formed by a recessed portion of top pad 112 and has a bottom surface 166 spaced vertically below the higher top surface 113 at peripheral portions of the pad 112, as shown. Air plenum 161 may have a complementary shape to top pad 112 (e.g. square in this embodiment), or a different shape.

The air inlets 160 may be formed in one embodiment from short sections of pipe attached directly to and removable as a unit with the cover plate 162 (both of which preferably are formed of metal) by any suitable means (e.g. fasteners, welding, etc.). Cover plate 162 includes apertures 167 which fluidly communication with short pipe sections. The air inlet 160 pipe sections include lateral airflow openings 164 cut into the sides of the pipe and the open free end is covered by a weather cap 163 to prevent the direct ingress of rain and/or debris. The top end of shell 120 may include a plurality of circumferentially spaced apart airflow openings 165 which are in fluid communication with air plenum 161 to allow ambient ventilation air to flow through the air inlets 160 into the plenum and in turn down into the downcomer ventilation shaft 125 through the openings 165.

The ambient ventilation cooling air is admitted through a plurality of air inlets 160 in the top pad 112 that are arranged to be non-preferential with respect to the horizontal direction of the wind to maximum cooling of the canisters in storage module 110. In one non-limiting embodiment, four air inlets 160 may be provided with one inlet being positioned at each of the four corners of the top pad 112 to ensure each quadrant of the storage module 110 via the downcomer ventilation shaft 125 receives an equal amount of ambient cooling ventilation air. The air plenum 161 advantageously serves to further distribute the ventilation air uniformly to all portions of the downcomer ventilation shaft 125.

It will be appreciated that other suitable configurations and numbers of air inlets 160 and configurations of air plenum 161 may be provided depending on the configuration of top pad 112 used and other factors.

The heated ventilation air exits riser ventilation shaft 134 from storage module 110 through a central airflow passageway 201 in the top lid 200 shown in FIGS. 4, 4A, and 5. Top lid 200 is a removable cover that closes storage module 110 and is positioned over the tops 121 and 131 of outer and inner shells 120, 130, respectively.

The top lid 200 is a massive stepped-shaped circular shielded structure in one embodiment equipped with a diametrically enlarged upper portion 202 and smaller cylindrical bottom protrusion 203 extending downwards therefrom. The upper portion 202 has a larger diameter than the diameter of the outer shell 120 forming an annular shaped peripheral portion (in top plan view) overhanging the outer shell. In some embodiments, upper portion 202 is configured and dimensioned to close off both the open tops 121, 131 of the outer and inner shells 120, 130. This effectively seals off the top of vertical downcomer ventilation shaft 125 to prevent inlet cooling ventilation air entering from air plenum 161 via airflow openings 165 at the top of outer shell 120 from bypassing the shaft 125 and entering the riser ventilation shaft 134 at the top of the storage module 110. In some embodiments, a top seal plate may be used to seal the top of vertical downcomer ventilation shaft 125 in addition to top lid 200.

An annular gasket 250 formed of a suitable material may be provided between the underside of the upper portion 202 of top lid 200 and the inner top 131 of the inner shell 130 providing a sealed lid-to-inner shell interface (see FIG. 4A).

The bottom protrusion 203 has a diameter smaller than the inner shell 130 and forms a plug that is inserted at least partially into the inner shell into cavity 122 to keep the lid 200 from sliding in a lateral direction excessively during a seismic event (e.g. earthquake). The annular gap G formed between the bottom protrusion 203 and inner surface of inner shell 130 forms a continuation of vertical riser ventilation shaft 134 as best shown in FIGS. 4A and 5.

In some embodiments, the top lid 150 may be a substantially hollow metal structure filled with a radiation absorbing material shielding such as concrete. The metal exoskeleton of top lid 150 can be constructed of a wide variety of materials, including without limitation various steel, stainless steel, aluminum, aluminum-alloys, and other metals. In some embodiments, the lid may be constructed of a single piece of material, such as concrete or steel for example.

With continuing reference to FIGS. 4, 4A, and 5, upper portion 202 of top lid 200 is annular shaped which defines the central airflow passageway 201 to eject heated ventilation air from vertical riser ventilation shaft 134 to the ambient environment. To complete this airflow circuit, the bottom protrusion 203 of lid 200 includes a plurality of radially extending air passages 205 which are in fluid communication with the annular-shaped riser ventilation shaft 134 and central airflow passageway 201 in the upper portion 202 of the lid. An air outlet 210 extending upwards from top lid 200 may be mechanically thereto and fluidly coupled to central airflow passageway 201 to help vent heated ventilation air away from storage module 110. The air outlet 210 may be formed in one embodiment from a short section of pipe attached to the upper portion 202 of top lid 200 by any suitable means (e.g. fasteners, welding, etc.). The air outlet pipe sections include lateral airflow openings 211 cut into the sides of the pipe and the open free end is covered by a weather cap 212 to prevent the direct ingress of rain and/or debris.

In one embodiment, top lid 200 may include four intersecting rigging plates 204 useable to raiser and lower the lid into position on storage module 110 (see, e.g. FIGS. 4 and 4A). The plates 204 may be welded to the metal exoskeleton plates of the lid 200. The plates 204 may extend from the bottom of bottom protrusion 203 to the top of upper portion 202, and in some embodiments have center extension sections 206 which extend radially inwards into central airflow passageway 201 and protrude upwards therefrom. Extension section of rigging plates 204 may therefore extend vertically upwards into and be covered by air outlet 210 when storage module 110 is in use. Extension sections 206 are configured for grappling by rigging and hoisting equipment (e.g. holes, clips, etc.) to facilitate manipulating and maneuvering the top lid 200. Other suitable configurations and arrangements for rigging lid 200 are possible.

FIG. 5 is an airflow diagram showing the cooling ventilation air path through storage module 110 created by the features described above. As shown by the directional airflow arrows in this figure, the cooling ventilation air will travel in a generally U-shaped airflow path through the storage module 110 to remove and dissipate decay heat emitted from the canisters 140 by the spent nuclear fuel and/or radioactive waste stored therein. Airflow circulation is created by natural convection induced by the decay heat liberated.

In operation, ambient cooling air is first drawn into air plenum 161 through each of the individual air inlets 160 and is mixed together. The inlet air circulates around and through the plenum. It should be noted that the air plenum 161 prevents ambient air flowing from the air inlets 160 directly into the annular vertical downcomer ventilation shaft 125. Advantageously, this mitigates the effects of preferential wind direction which otherwise might adversely affect the amounts of cooling ventilating airflow reaching certain portions of the storage module 110 and canisters 140 therein. Without the plenum and its airflow balancing effects, certain areas of the canisters 140 may be starved of cooling air while other portions receive cooling resulting in differential cooling of the canisters shell sidewalls 141. This would reduce the natural convection cooling efficiency.

With continuing reference to FIG. 5, the cooling ventilation air leaves the air plenum 161 through the airflow openings 165 and enters the vertical downcomer ventilation shaft 125. The air flows downwards in the downcomer ventilation shaft 125 towards the bottom of the storage module 110. The cooling ventilation air travels through the plurality of airflow openings 135 formed at the bottom end of the inner shell 130 near its bottom 132 (see also FIGS. 4 and 4C) and enters the bottom of cavity 122 and the annular vertical riser ventilation shaft 134.

The cooling air reverses direction and flows upward through the riser ventilation shaft 134 contacting the exposed outer circumferential surfaces of the first the bottom and then the top canister 140 in storage module 110 to draw away decay heat via convection. As the ventilation air flows vertically upward along the canisters 140 in the riser ventilation shaft 134, the air becomes progressively heated.

The now heated ventilation air flows to and eventually reaches the top of the storage module 110 at the top of cavity 122 in the vertical riser ventilation shaft 134. The air flow changes direction and flows radially inwards through the radial air passages 205 in top lid 200 and is recombined in the central airflow passageway 201 in the upper portion 202 of the lid. The ventilation air then changes direction again and flows vertically upward entering air outlet 210 from which it is exhausted to atmosphere completing the ventilation airflow cycle.

The support and placement of the multiple canisters 140 in storage module 110 will now further described.

Referring to FIGS. 4 and 4C, the bottom or lower canister 140 (shown in, e.g. FIGS. 2 and 3) is horizontally supported and laterally restrained by a circumferentially spaced apart series of suitably shaped centering lugs 300. Lugs 300 are oriented and extend in a radial direction from the vertical axis VA of the storage module 110. When placed in the storage module 110, the lower canister 140 rests on bottom plate 123 welded to the outer shell 120 and transfers dead load (weight) of both the lower and top or upper canisters 140 housed in the storage module 110 to the concrete base pad 106. The canister 140 is positioned laterally adjacent to and inside the ring of radial lugs 300 as seen in FIG. 2. The lugs 300 are located proximate to the shell sidewall 141 of the canister 140 and positioned to fully engage the canister in the event of a lateral shift in position of the canister caused by a seismic event. This would stabilize the canister 140 and prevent excessive horizontal movement to protect the canister and its contents. Any suitable number of lugs 300 may be provided.

Lugs 300 may be formed from generally flat steel plate in one embodiment and extend both upwards and inwards from the outer shell 120 towards the vertical axis VA (see, e.g. FIG. 6A). As shown, the lugs 300 may have a substantially greater radial width and axial height than thickness T (thickness being measured perpendicular to the width and height in a circumferential direction along the outer shell 120). At least a portion of the innermost axial edge 301 of lugs 300 is preferably straight or flat and arranged parallel to the shell sidewall 141 of canister 140 and vertical axis VA to prevent puncturing the canister in case of a seismic event. The lug 300 includes an angled edge 302 which adjoins the axial edge 301 that is angled downwards and inwards as shown in FIG. 6A. When the lower canister 140 is initially lowered into storage module 110, this angled edge 302 helps blindly guide and center the bottom 143 of the canister towards the centerline or vertical axis VA so that the canister becomes properly seated on the bottom plate 123 or ring 310 if provided.

Centering and spacing lugs 300 may be attached to the outer shell 120 and/or inner shell 130 and are essentially not vertical load bearing structural members. In one exemplary arrangement, lugs 300 may be directly attached to the shell 120 (e.g. welded) through slots 136 formed through inner shell 130 at the location of each lug 300. The slots may be closed at the top and open at the bottom adjacent bottom 132 of the inner shell 130 to allow the inner shell to slide over the lugs when initially inserted into the outer shell 120 during fabrication. The bottom ends of the inner shell 130 may then rest on the flat bottom plate 123 affixed to the outer shell 120.

In one embodiment shown in FIGS. 6 and 6A, an interfacing centering and spacing bottom ring 310 may be provided for some specific canister designs to engage the bottom 143 of the canister. Ring 310 is disposed inside the lugs 300 and may be fixedly attached thereto (e.g. welded) or a separate element in various embodiments. In the latter separate or loose construction, the ring 310 may have peripheral notches configured to engage the lugs 300 for preventing the ring from rotating in relation to the lugs and outer shell 120. On other embodiments, the ring 300 fits loosely inside lugs 300 without notches. The ring 300 rests on bottom plate 123 of outer shell 120 in abutting contact for transferring dead load (weight) of the canister 140 to the concrete base pad 106. Ring 310 is preferably made of metal, such as a suitable steel.

In some embodiments, the top surface 311 of ring 310 may be castellated including a plurality of alternating arcuate raised segments 312 and arcuate recessed segments 314 having a complementary configuration to match and engage similarly configured features on the bottom 143 of a lower canister 140. The segments 312, 314 may extend radially from the inside to the outside of the ring 300 as best shown in FIG. 6A. Segments 312, 314 have a circumferentially measured arc width greater than the corresponding width of the lugs 300, and preferably may have a width at least coextensive with the radial depth of the segments (measured from the center of the ring outwards). The bottom surface 313 of ring 310 may be substantially flat.

Figure 2A:
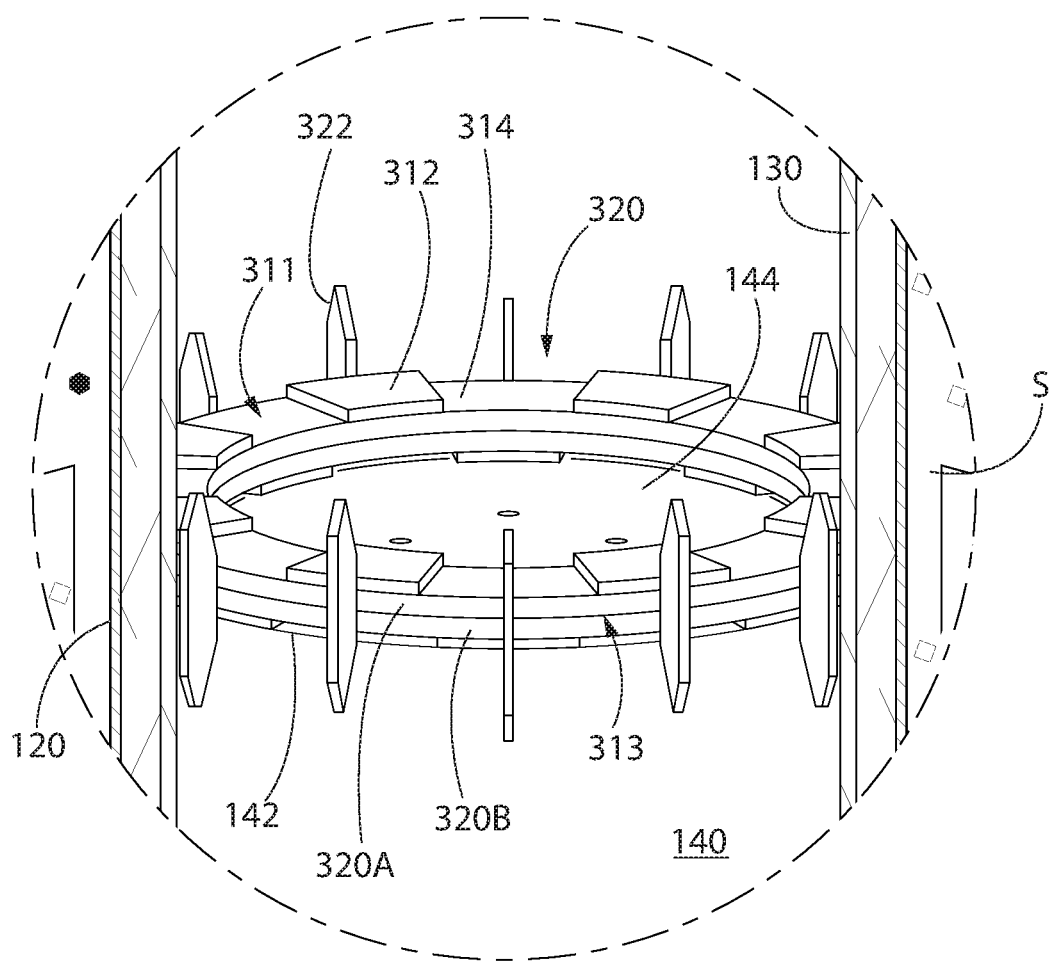
FIG. 2A is a detailed view from FIG. 2.

Referring to FIGS. 2, 2A, and 5, the lower and upper canisters 140 are horizontally supported and laterally restrained against the inner shell 130 by a centering and spacing middle ring 320. Ring 320 may be configured and constructed similarly to bottom support ring 310 described above and shown in FIGS. 6 and 6A. In one embodiment, middle ring 320 may be a composite structure formed of an upper ring 320A and lower ring 320B each shaped similarly to bottom ring 310. The two rings 320A, 320B may be attached together (e.g. welded) in back-to-back relationship with flat bottoms 313 in contact and exposed surfaces 311 with the raised and recessed segments 312, 314 facing axially outwards as best shown in FIG. 2A.

It will be appreciated that in some embodiments, the upward and downward facing exposed top surfaces 311 of the middle ring 310 may be substantially flat without raised/recessed segments 312, 314 depending on the canister design used. If different configuration lower and upper canisters 140 are to be accommodated in the storage module 110, one of the rings 310A or 310B may be castellated (i.e. raised/recessed segments 312, 314) and the other may be flat on both surfaces. Accordingly, any combination may advantageously be used depending on the canister types to be stored in the storage module 110.

Referring to FIGS. 2, 2A, and 5, centering and spacing middle ring 320 assembly further includes radially extending centering lugs 322 arranged in a circumferentially spaced pattern around the ring similarly to the bottom lugs 300 and ring 310 assembly already described. In one construction, the centering lugs 322 are welded around the perimeter of middle ring 320 and made integral therewith; both of which preferably are both made of suitable metal such as steel. The lugs 322 may not be fixedly attached to the inner shell 130 of storage module 110 such that the middle ring-lug assembly 320/322 is removable as a unit from the storage module with the canisters 140. This allows the first lower canister 140 to be first positioned in the bottom half of the storage module 110, the middle ring-lug assembly 320/322 then lowered and placed on top of the lower canister, and then the second upper canister 140 lowered and positioned into the top half of the storage module 110 to engage the middle ring-lug assembly 320/322. The middle ring-lug assembly 320/322 may alternatively be lowered into the inner shell 130 with the lower canister simultaneously allowing the ring-lug assembly to be placed on top of the lower canister before being lowered into the inner shell together in one step.

FIG. 2 shows the lower canister 140 in position within the storage module 110 and ready for receiving the upper canister 140. The middle ring-lug assembly 320/322 is in position. The centering lugs 322 may have a similar side profile as lugs 310 already described including angled edges 302 to help guide and center the bottom 143 of the upper canister 140 when lowered into storage module 110 on top of the lower canister (see also FIG. 2A). Both the upper and lower portions of lugs 322 may include angled edges 302 as shown which helps center and properly position the middle ring-lug assembly 320/322 on the top 142 of the lower canister 140 when the assembly is lowered into place in the storage module 110. Accordingly, in one embodiment the upper and lower portions of lugs 322 are mirror images.

Figure 3:
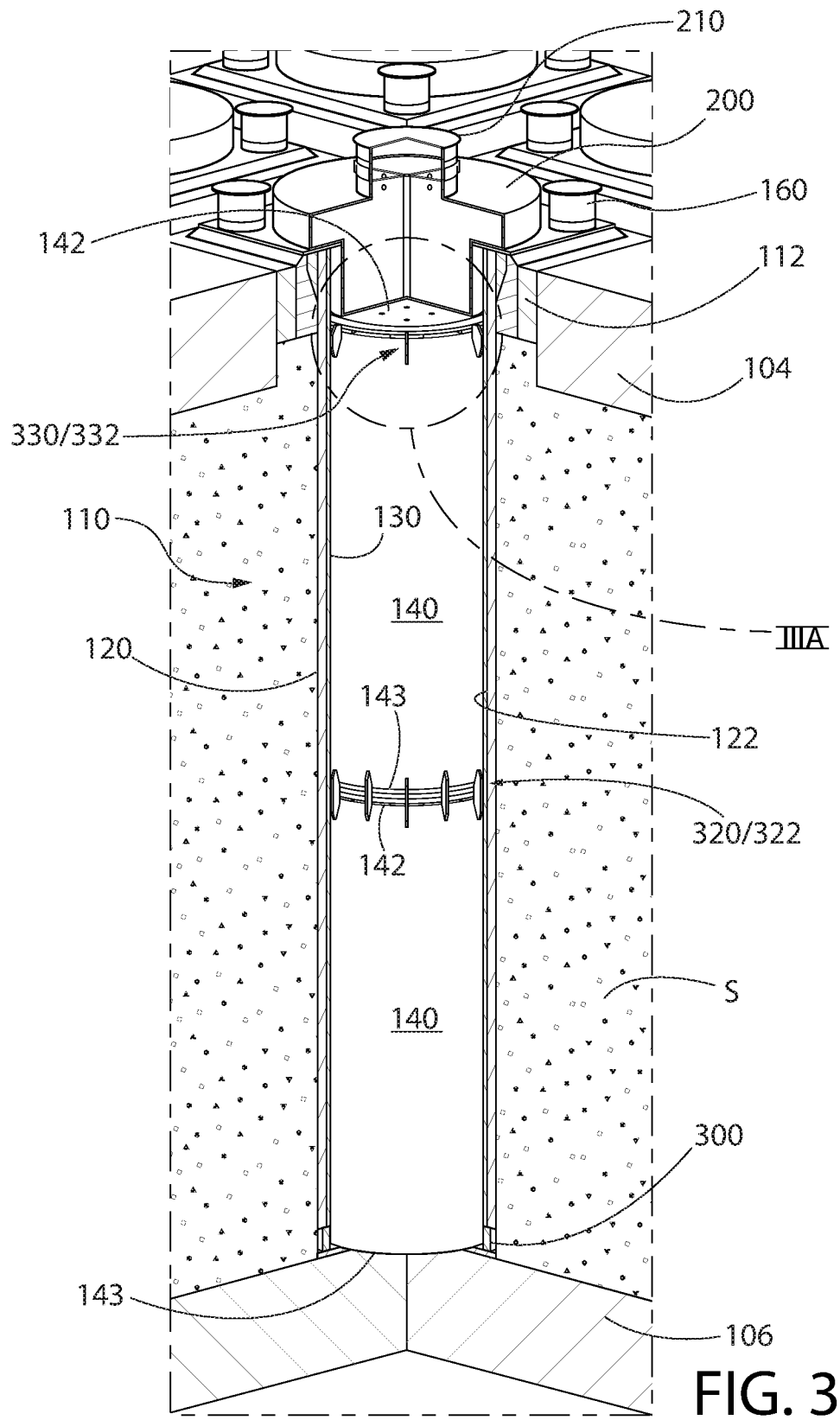
FIG. 3 is a three-dimensional cross-sectional view of a fully installed storage module showing two vertically stacked canisters positioned in the module.
Figure 3A:
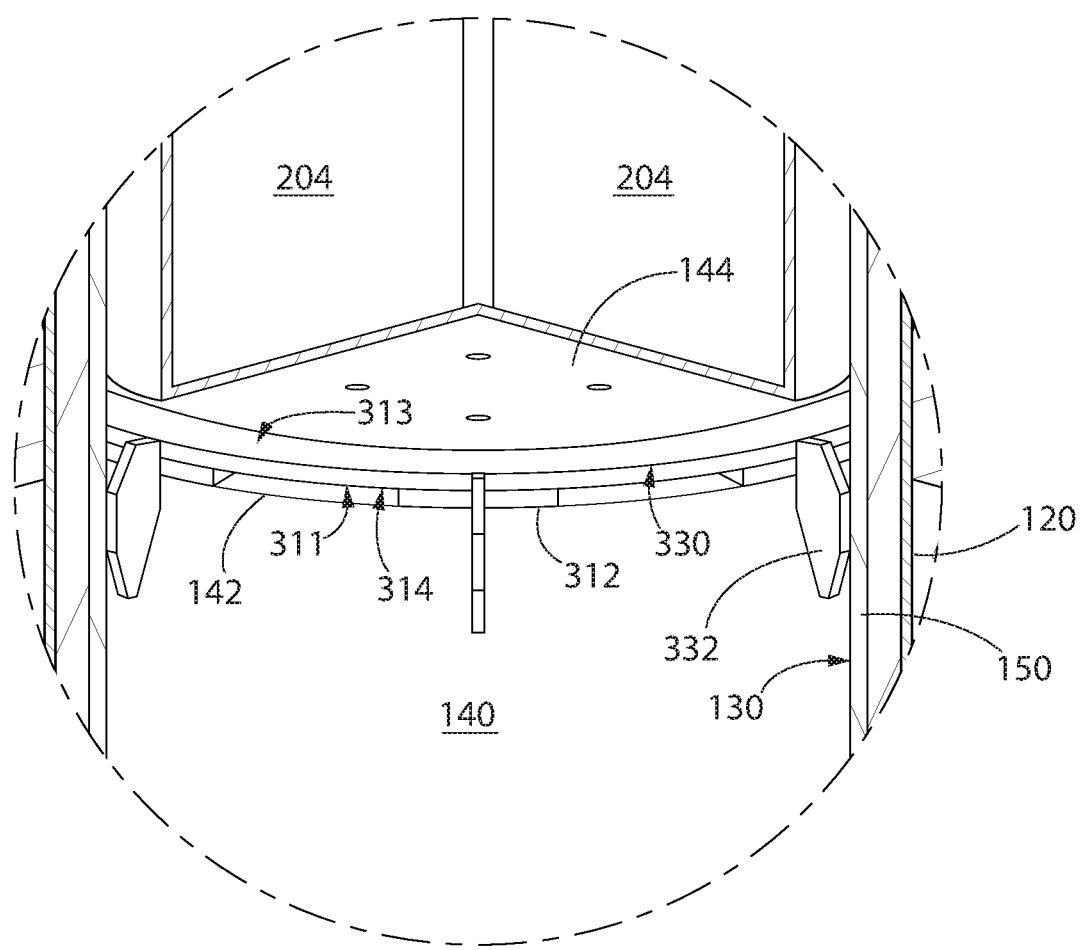
FIG. 3A is a detailed view from FIG. 3.

It will be appreciated that middle ring-lug assembly 320/322 in conjunction with the lower canister 140 supports the upper canister 140 as shown in FIGS. 3 and 3A. Advantageously, from a structural standpoint, the middle ring 320 transfers and distributes the weight of the upper canister to the inherently stronger and stiffer cylindrical sidewalls of the shell sidewall 141 of the lower canister instead of onto the central portion of the structurally weaker canister lid. This enhances the load bearing capability of the lower canister for supporting the weight of the upper canister.

The middle ring-lug assembly 320/322 also laterally restrains the bottom end 143 of the upper canister 140. Accordingly, the centering lugs 322 are configured, dimensioned, and positioned to engage both the top 142 of the lower canister 140 and the bottom 143 of the upper canister 140. Significantly, the middle ring-lug assembly 320/322 further serves to maintain the inner annular space 133 and vertical riser ventilation shaft 134 formed between the canisters 140 and inner shell 130 by providing proper horizontal aligned of the canisters along the vertical axis VA of the storage module 110. The middle ring-lug assembly 320/322 also provides some vertical spacing between the top 142 of the lower canister 140 and bottom of the upper canister 140 to permit cooling ventilation air to flow in the small space between the two canisters to enhance cooling the canisters.

Referring to FIGS. 3 and 3A, a top ring-lug assembly 330/332 is also provided to laterally support and restrain the top 142 of the upper canister 140 against the inner shell 130. This assembly is comprised of a single support ring 330 having the arcuate raised/recessed segments 312, 314 facing downwards towards the upper canister. The plurality of centering lugs 332 are welded to the perimeter of ring 330 in a similar manner to the middle ring 320 as already described. Preferably, the lugs 332 are not fixedly attached to the inner shell 130 like the middle centering lugs 322 to allow the top ring-lug assembly 330/332 to be removable in the same manner from the storage module 110. In some embodiments, both the top and bottom surfaces 311, 313 of the top ring 330 may be substantially flat instead of castellated. The centering lugs 332 may be configured similarly to lugs 310 or 322 already described.

It should be noted that the centering lugs 300, 322, and 332 laterally restrain and horizontally support the lower and upper canisters 140 inside storage module 110 during a seismic event (e.g. earthquake) against excessive movement. In addition, these lugs also maintain the inner annular space 133 along the entire height of the module to preserve the inner annular space 133 between the sidewalls of the canister shells 140 and inner shell 130 of the storage module 110 thereby protecting the integrity of the vertical riser ventilation shaft 134 for proper ventilated cooling of the canisters.

It should be noted that the support rings 310, 320, and 330 with undulating top surfaces 311 having raised and recessed segments 312, 314 may be used with both canisters 140 having plain (i.e. flat) top and bottom ends, or with specially configured ends as described herein with complementary configured ends as the rings to provide an anti-rotation feature. In other possible embodiments, the rings 310, 320, 330 may be substantially flat on both the top surface 311 and opposing bottom surface 313.

In some alternative constructions, the middle and top lugs 322, 332 may be attached (welded) to the inner shell 130 of the storage module 110 and rings 320, 330 may be separate and removable elements.

FIGS. 3 and 3A show storage module 110 with both lower and upper canisters 140 in position and top lid 200 in place after insertion of the canisters. The lower and upper canisters 140 are concentrically aligned with the vertical axis VA of the storage module 110. In one embodiment, the diameter of the inner shell 130 and diameter of the internal cavity 122 are only wide enough to accommodate a single canister 140 at each elevation of the storage module 110 so that two canisters will not fit in side-by-side relationship in the storage module. The canisters 140 undergo cooling by natural convection via the ventilated cooling air system described above and shown by the directional airflow arrows in FIG. 5. It stands noting that the upper canister 140 does not directly contact the lower canister, but instead bears on middle ring-lug assembly 320/322 which vertically separates and spaces the two canisters. The dead load or weight of the upper canister is transferred through the middle ring-lug assembly 320/322 to the lower canister which bears the weight of the upper canister.

It will be appreciated that the number of vertically stacked canisters in each storage module 110 may be limited by the load carrying capacity of the canisters themselves since each canister in the stack transmits and bears the weight of the canisters above; the lowermost canister 140 in the stack bearing the entire dead weight of the whole canister stack. Accordingly, a vertically deeper (higher) storage module 110 and internal cavity 122 with additional canisters can be deployed if the structural strength of the lowermost canister 140 and the support foundation were accordingly strengthened to support greater than two canisters.

According to the present invention, it bears noting that the top and bottom canisters 140 can be of different diameters and heights within a range of limits which fit within the storage module 110. The centering and spacing rings 310, 320, 330 with lugs 300, 322, 332 as described herein can be customized to provide the necessary adaptation for varying canister diameters and different end type features. Accordingly, the storage modules 110 disclosed herein are highly customizable to accept numerous types and sizes of canisters from a number of different canister suppliers or sources.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A storage module for vertically-stacked storage of nuclear waste canisters comprising:
   an elongated outer shell defining a vertical axis and an internal cavity;
   a removable top lid mounted on a top end of the outer shell covering the cavity;
   a bottom plate mounted on a bottom end of the outer shell;
   a first canister positioned in the cavity in a lower position, the first canister including a top, a bottom, and a sidewall extending between the top and bottom;
   a second canister vertically stacked above the first canister in an upper position and including a top, a bottom, and a sidewall extending between the top and bottom, the first and second canisters being concentrically aligned with the vertical axis;
   a middle ring-lug assembly interspersed between and engaging the first and second canisters;
   the middle ring-lug assembly comprising a ring and plurality of vertically elongated centering lugs spaced circumferentially apart around a perimeter of the ring;
   wherein the lugs of the middle ring-lug assembly are each configured to laterally support and restrain the first and second canisters against the module;
   wherein the lugs of middle ring-lug assembly each protrude laterally outwards beyond the ring and the sidewalls of the first and second canisters to engage an interior surface of the module; and
   wherein lugs of the middle ring-lug assembly each extend upwards above the ring and downwardly below the ring.

2. The module of claim 1, wherein the middle ring-lug assembly is configured and operable to transfer weight of the second canister to the first canister.

3. The module of claim 1, wherein the ring of the middle ring-lug assembly includes an upward facing upper castellated surface engaging the bottom of the first canister.

4. The module of claim 3, wherein the upper castellated surface includes a plurality of alternating arcuate raised segments and arcuate recessed segments.

5. The module of claim 4, wherein the raised segments engage the bottom of the first canister and the recessed segments are spaced apart from the bottom of the first canister.

6. The module of claim 4, wherein the ring of the middle ring-lug assembly includes a downward facing lower castellated surface engaging the bottom of the first canister.

7. The module of claim 6, wherein the lower castellated surface includes a plurality of alternating arcuate raised segments and arcuate recessed segments.

8. The module of claim 6, wherein the ring has a composite structure formed of an upper ring and a lower ring attached together in back-to-back relationship with flat bottoms of the upper and lower rings in mutual abutting contact.

9. The module of claim 8, wherein the upper ring is welded to the lower ring.

10. The module of claim 1, wherein the lugs of the middle ring-lug assembly each have a flattened plate-like body which is vertically oriented on the ring.

11. The module of claim 10, wherein the lugs of the middle ring-lug assembly each include an angled inner edge above the ring arranged to engage and center the bottom of the first canister when lowered into the storage module on top of the second canister.

12. The module of claim 11, wherein each lug further includes a vertically oriented axial inner edge adjoining the angle inner edge.

13. The module of claim 12, wherein each lug further includes an angled inner edge below the ring arranged to engage and center the ring on the top of the second canister when the ring is lowered into the storage module on top of the second canister.

14. The module according to claim 1, wherein each lug of the middle ring-lug assembly extends vertically upwards above the bottom of the first canister to engage and restrain its sidewall against lateral movement, and vertically downward below the top of the second canister to engage and restrain its sidewall against lateral movement.

15. The module of claim 1, further comprising a top ring-lug assembly engaging the top of the first canister beneath the lid of the module, the top ring-lug assembly comprising a ring and plurality of vertically elongated centering lugs spaced circumferentially apart around a perimeter of the ring and protruding radially outwards from the ring, wherein the lugs of the top ring-lug assembly are each configured to laterally support and restrain the first canister against the module.

16. The module of claim 15, wherein the lugs of the top ring-lug assembly extend downwards below the ring to engage a sidewall of the first canister.

17. The module of claim 15, further comprising a bottom ring-lug assembly engaging the bottom of the second canister seated on the bottom plate of the module, the bottom ring-lug assembly comprising a ring and plurality of vertically elongated centering lugs spaced circumferentially apart around a perimeter of the ring and protruding radially outwards from the ring, wherein the lugs of the top ring-lug assembly are each configured to laterally support and restrain the second canister against the module.

18. The module of claim 17, wherein the lugs of the bottom ring-lug assembly extend upwards above the ring to engage a sidewall of the second canister.

19. The system of claim 15, wherein the rings of the top and bottom ring-lug assemblies each have a castellated surface.

20. A storage module for vertically-stacked storage of nuclear waste canisters comprising:
   an elongated outer shell defining a vertical axis and an internal cavity;
   an elongated inner shell disposed in the cavity and concentrically aligned with the outer shell;
   a first canister positioned in the cavity in a lower position, the first canister including a top, a bottom, and a sidewall extending between the top and bottom;
   a second canister vertically stacked above the first canister in an upper position and including a top, a bottom, and a sidewall extending between the top and bottom, the first and second canisters being concentrically aligned with the vertical axis;
   a middle ring-lug assembly interspersed between and engaging the bottom of the first and the top of the second canister; a
   the middle ring-lug assembly comprising a ring and plurality of vertically elongated centering lugs spaced circumferentially apart around a perimeter of the ring, each lug protruding radially outwards from ring and configured to engage the inner shell to laterally restrain and support the first and second canisters;
   wherein an annular space is maintained by the middle ring-lug assembly between the first and second canisters and the inner shell;
   wherein the ring of the middle ring-lug assembly includes an upward facing upper castellated surface engaging the bottom of the first canister, and a downward facing lower castellated surface engaging the top of the second canister.

21. The module according to claim 20, wherein each lug of the middle ring-lug assembly has a flat plate-like body including a first portion which extends vertically upwards above the bottom of the first canister to engage and restrain its sidewall against lateral movement, and a second portion which extends vertically downward below the top of the second canister to engage and restrain its sidewall against lateral movement.

* * * * *